(12) United States Patent
Pursifull

(10) Patent No.: US 9,303,592 B2
(45) Date of Patent: Apr. 5, 2016

(54) CRANKCASE VENTILATION TUBE DISCONNECT DETECTION VIA HUMIDITY SENSOR

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 592 days.

(21) Appl. No.: 13/687,923

(22) Filed: Nov. 28, 2012

(65) Prior Publication Data

US 2014/0149015 A1 May 29, 2014

(51) Int. Cl.
*F02M 25/06* (2006.01)

(52) U.S. Cl.
CPC .............. *F02M 25/06* (2013.01); *Y02T 10/121* (2013.01)

(58) Field of Classification Search
CPC ....... F02M 25/06; F01M 13/00; F01M 11/10; F01M 2011/146; Y02T 10/121
USPC .................................................. 123/472–474
See application file for complete search history.

(56) References Cited

U.S. PATENT DOCUMENTS

| | | | | |
|---|---|---|---|---|
| 3,181,833 A * | 5/1965 | Adams et al. | ................. | 251/121 |
| 5,095,844 A | 3/1992 | Alexander | | |
| 5,890,475 A * | 4/1999 | Dallman | ....................... | 123/573 |
| 6,575,148 B1 * | 6/2003 | Bhargava et al. | ............. | 123/564 |
| 7,043,402 B2 * | 5/2006 | Phillips et al. | ................ | 702/184 |
| 2003/0222656 A1 * | 12/2003 | Phillips et al. | ................ | 324/605 |
| 2008/0027661 A1 * | 1/2008 | Aikawa | ............................ | 702/50 |
| 2008/0154671 A1 * | 6/2008 | Delk | ................................ | 705/7 |
| 2010/0031904 A1 * | 2/2010 | Matsuura et al. | .......... | 123/41.86 |
| 2010/0258099 A1 | 10/2010 | Andersson et al. | | |
| 2013/0268182 A1 * | 10/2013 | Treharne et al. | ............. | 701/113 |
| 2014/0202437 A1 * | 7/2014 | Surnilla et al. | .......... | 123/568.22 |
| 2014/0238369 A1 * | 8/2014 | Jankovic et al. | ............. | 123/690 |
| 2014/0238370 A1 * | 8/2014 | Pursifull et al. | ............. | 123/690 |

OTHER PUBLICATIONS

Pursifull, Ross Dykstra, "Humidity Sensor Diagnostics," U.S. Appl. No. 13/774,282, filed Feb. 22, 2013, 48 pages.
Pursifull, Ross Dykstra, "Humidity Sensor Diagnostics," U.S. Appl. No. 13/774,319, filed Feb. 22, 2013, 46 pages.
Pursifull, Ross Dykstra, "Humidity Sensor Diagnostic Method Using Condensation Clearing Heater," U.S. Appl. No. 13/857,884, filed Apr. 5, 2013, 38 pages.
Pursifull, Ross Dykstra, "Humidity Sensor and Engine System," U.S. Appl. No. 13/865,853, filed Apr. 18, 2013, 34 pages.
Anonymous, "Detection of Plumbing Disconnect in Ejector Portion of Fuel Vapor Purge System," IPCOM No. 000241283, Published Apr. 13, 2015, 2 pages.

* cited by examiner

*Primary Examiner* — Hieu T Vo
*Assistant Examiner* — Sherman Manley
(74) *Attorney, Agent, or Firm* — Julia Voutyras; Alleman Hall McCoy Russell & Tuttle LLP

(57) ABSTRACT

Methods and systems are provided for detecting degradation of a crankcase ventilation tube. Humidity sensed from a humidity sensor in the crankcase ventilation tube may provide an indication of crankcase ventilation tube disconnection during different engine operating conditions. The humidity sensor may further provide diagnosis of humidity sensor function and engine degradation.

17 Claims, 4 Drawing Sheets

CRANKCASE VENTILATION TUBE DISCONNECT DETECTION VIA HUMIDITY SENSOR

BACKGROUND/SUMMARY

Engines may include crankcase ventilation systems to vent gases out of the crankcase and into an engine intake to provide continual evacuation of gases from inside the crankcase in order to reduce degradation of various engine components in the crankcase. Under certain conditions, crankcase ventilation systems may be monitored to identify breaches in the system. For example, a crankcase ventilation tube may become disconnected, an oil cap may be off or loose, a dipstick may be out of position, and/or other seals in the crankcase ventilation system may be broken resulting in degradation of various components included in the crankcase.

Various approaches may be used to monitor crankcase ventilation system integrity. For example, a pressure sensor may be used in the crankcase and a valve in a crankcase vent tube may be opened so that pressure or vacuum changes may be sensed in the crankcase to determine if there is a breach in the system.

In other approaches, a plurality of absolute sensors, e.g., a barometric pressure sensor (BP), a compressor inlet pressure sensor (CIP), a throttle inlet pressure sensor (TIP), a manifold air pressure sensor (MAP), and/or a pressure sensor in a crankcase vent hose, etc., may be used in combination to monitor crankcase ventilation system integrity.

However, the inventors herein have recognized that such approaches may add additional hardware to such monitoring systems, e.g., additional sensors and valves, thus increasing costs and complexity of a crankcase ventilation monitoring system. Additionally, some of these sensors may be underutilized, e.g., the crankcase pressure sensor may only be used for crankcase breach detection, thus limiting the value of such sensors.

Thus, in one approach, to at least partially address these issues, an engine method is provided. The method comprises indicating crankcase ventilation tube degradation based on humidity. In this way, a crankcase ventilation tube connection may be indicated by a humidity sensor that is available to also provide information to other vehicle and/or engine systems.

In one example, the humidity may be determined from a humidity sensor placed in the crankcase ventilation tube. The sensed humidity may change depending on engine boosting. For example, when an intake manifold pressure is less than a barometric pressure (not boosted) the humidity sensor may read ambient humidity. Ambient humidity information may then be used to adjust engine operating parameters. In another example, when the intake manifold pressure is greater than barometric pressure (boosted), the humidity sensor may read a humidity value greater than ambient humidity when the crankcase ventilation tube is connected. Under the same conditions, the humidity sensor may read a lower humidity value (e.g., ambient humidity) when the crankcase ventilation tube is disconnected. In this way, degradation of the crankcase ventilation tube may be diagnosed based on sensed humidity and engine boosting.

Further, a humidity sensor in the crankcase ventilation tube may be used to diagnose the functionality of the humidity sensor and determine an estimation of a blowby rate. For example, if the humidity sensor's reading does not change under boosted and non-boosted engine operation, the sensor may be degraded. In another example, the rate of humidity climb when an intake manifold pressure increases from below barometric pressure to above barometric pressure may approximate a blowby rate. As such, a higher rate of humidity increase and higher blowby rate may indicate increased engine degradation.

In this way, a humidity sensor placed in the crankcase ventilation tube may provide diagnosis of engine health. The humidity sensor may also provide ambient humidity data, during selected conditions, in order to control other engine systems, along with diagnosing the proper functioning of the humidity sensor. Finally, the humidity sensor may provide an indication of crankcase ventilation tube disconnection.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
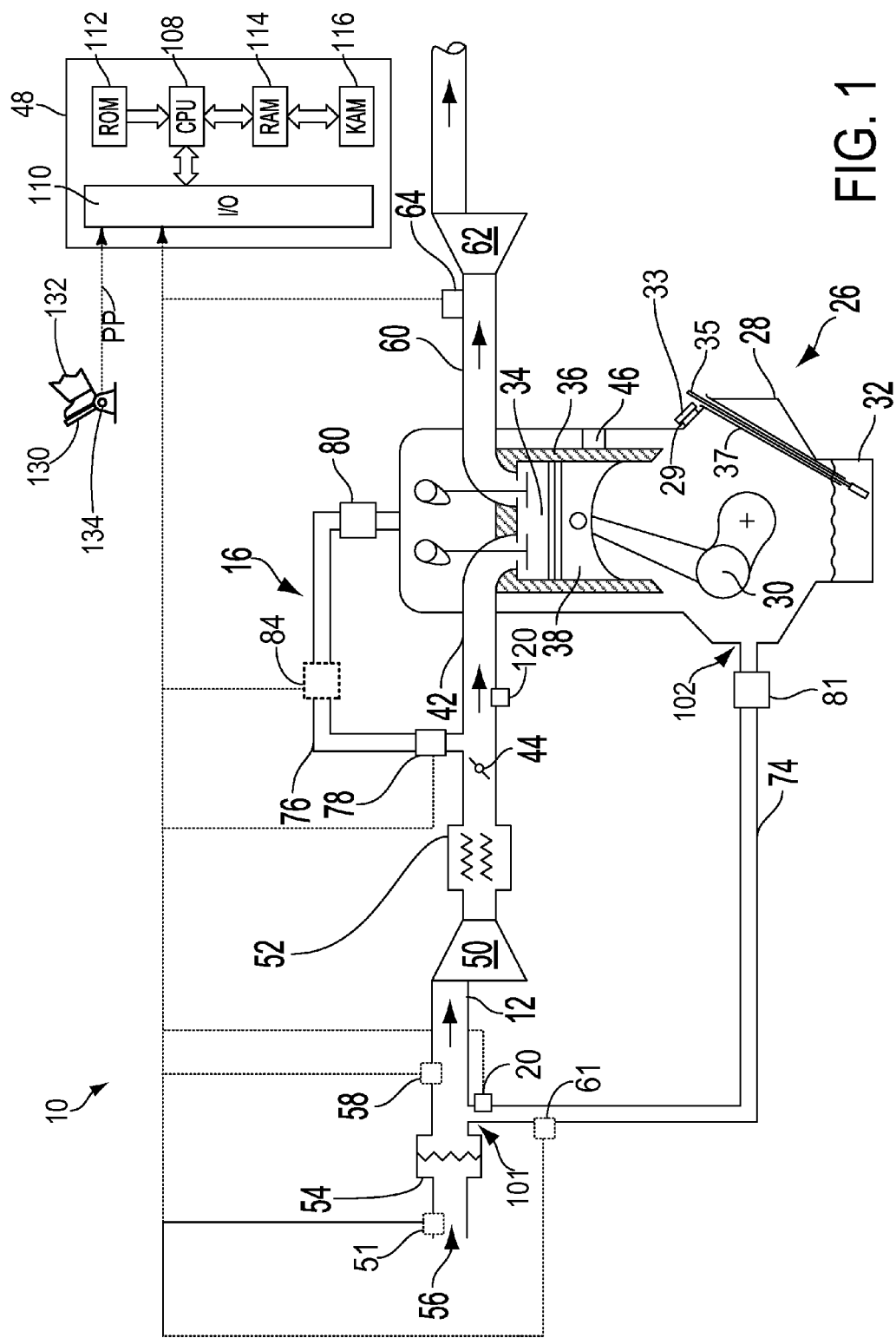
FIG. 1 is a schematic diagram of an example engine system including a positive crankcase ventilation system.
Figure 2:
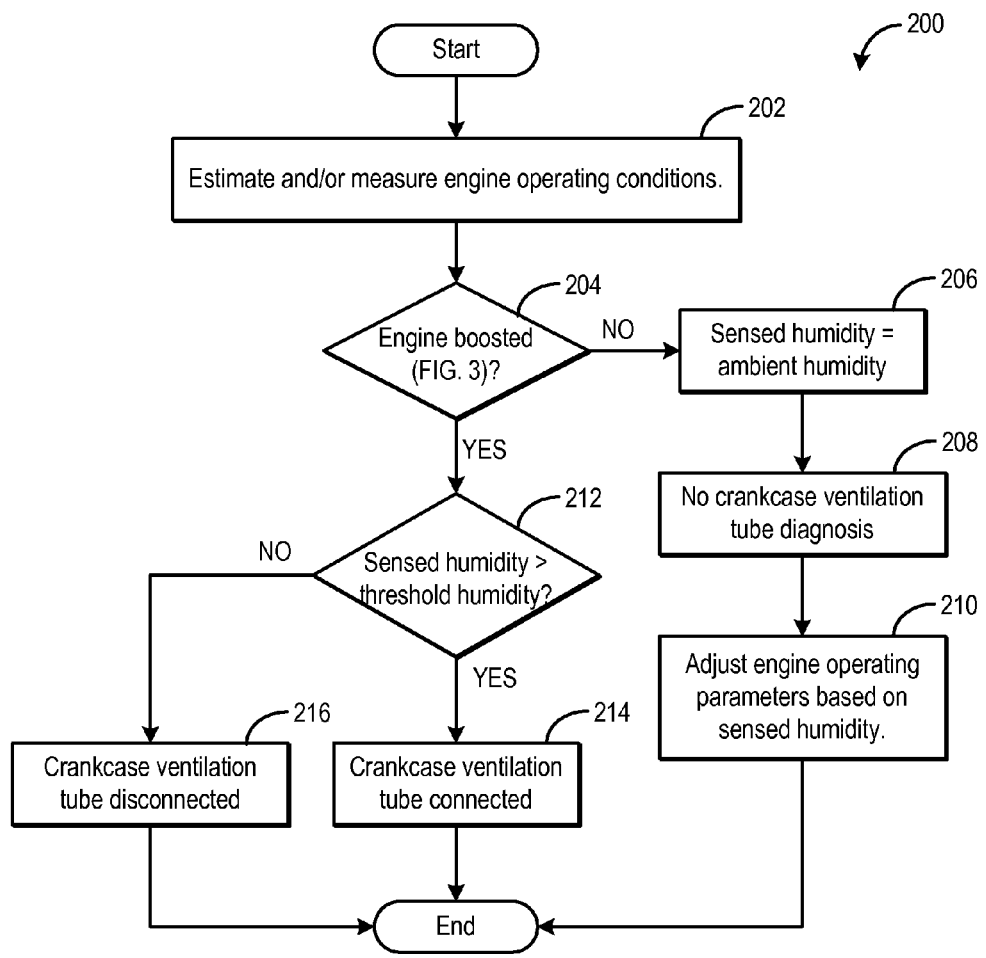
FIG. 2 shows a flow chart of a method for diagnosing a crankcase ventilation tube connection.
Figure 3:
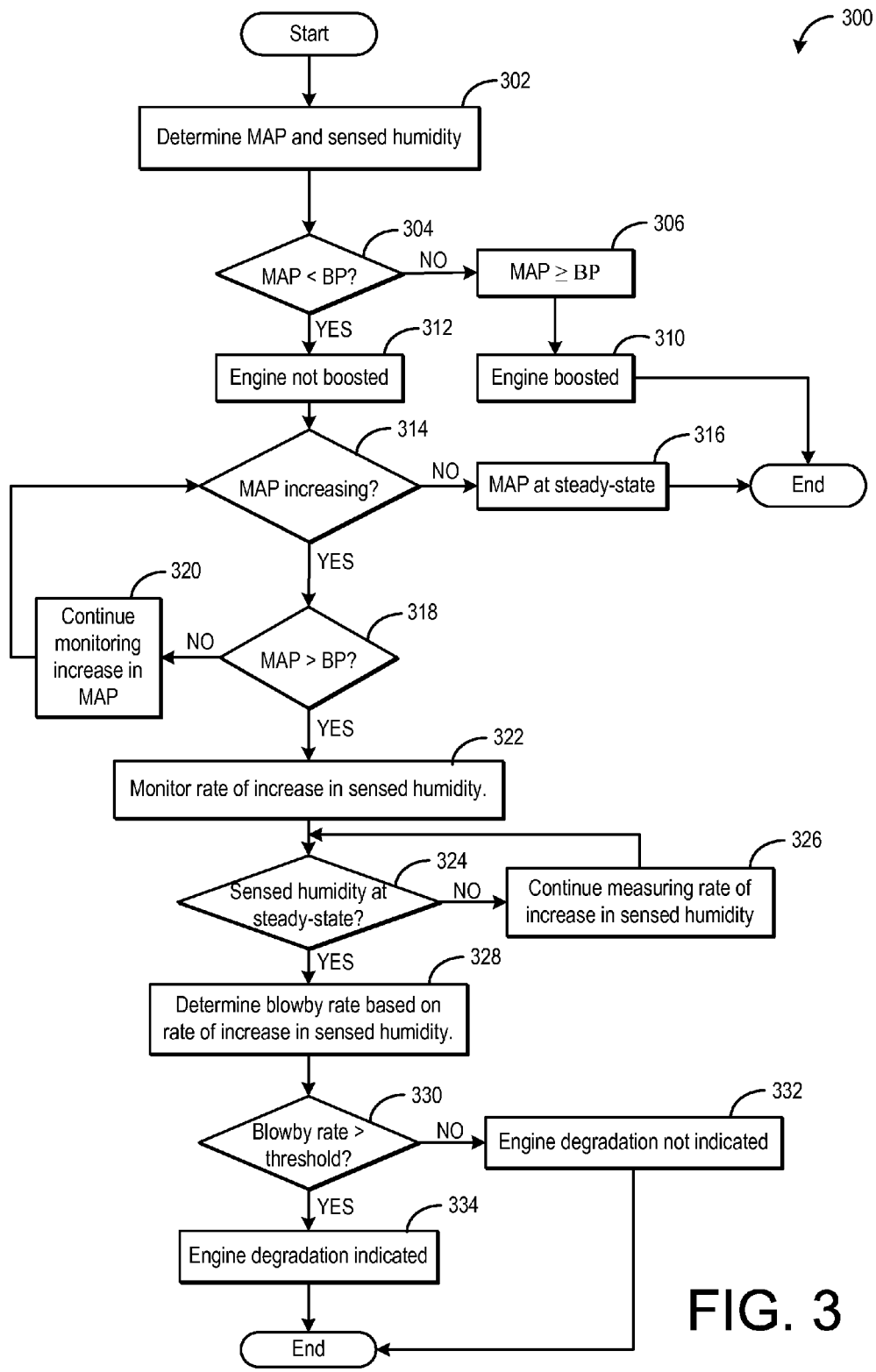
FIG. 3 shows a flow chart of a method for determining engine boosting and a blowby rate
Figure 4:
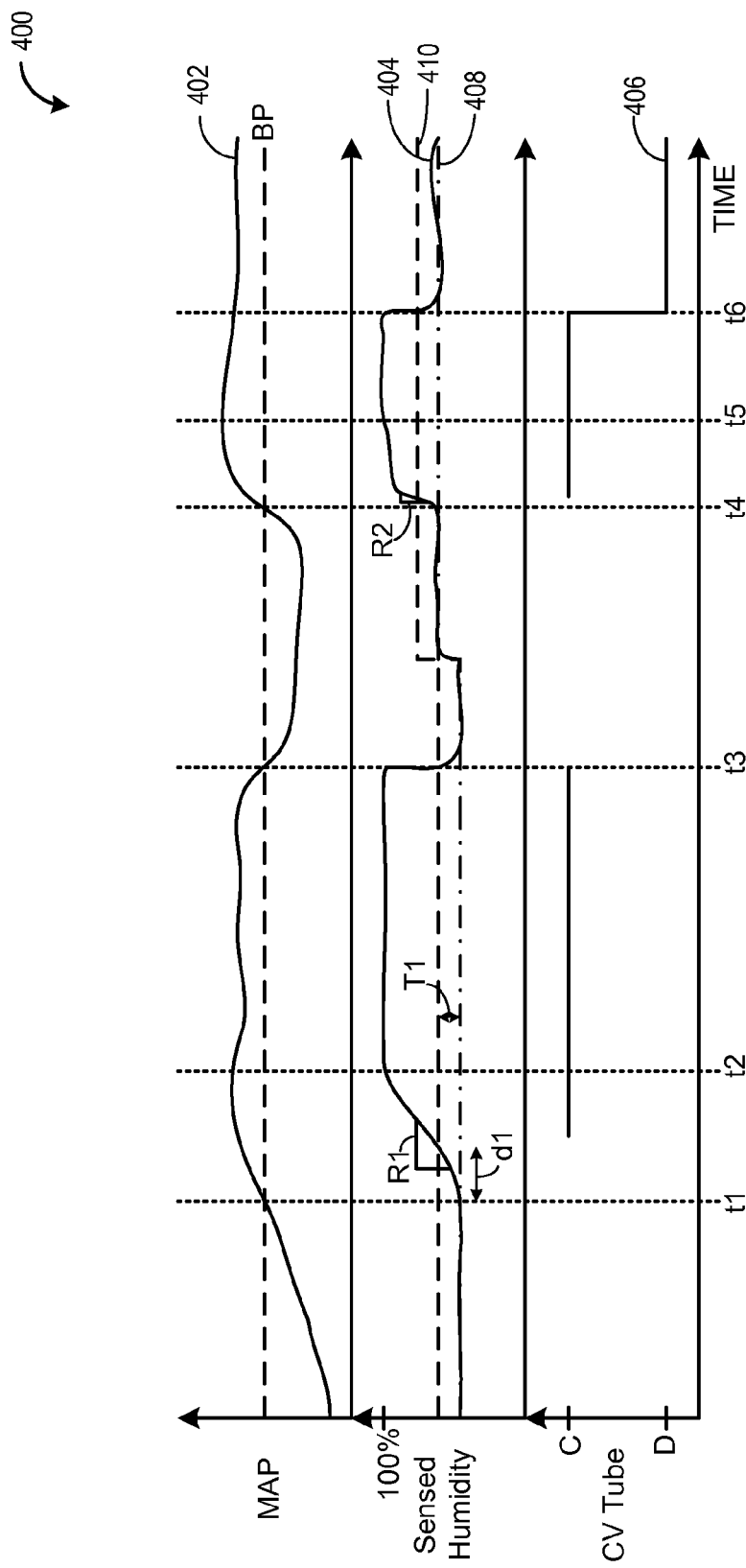
FIG. 4 shows a graphical example of a humidity sensor reading based on engine operating conditions.

The following description relates to systems and methods for indicating a crankcase ventilation tube is disconnected from a crankcase ventilation system, such as the system shown in FIG. 1. A humidity sensor may be positioned in the crankcase ventilation tube to measure or estimate humidity under different engine operating conditions. A method for diagnosing the crankcase ventilation tube connection based on humidity is shown at FIG. 2. The humidity sensor may read different values depending on engine boosting. The humidity may also be used to determine a blowby rate. FIG. 3 presents a method for determining engine boosting and the blowby rate. Example humidity sensor readings based on engine operating conditions are shown at FIG. 4.

Referring now to FIG. 1, it shows an example system configuration of a multi-cylinder engine, generally depicted at 10, which may be included in a propulsion system of an automobile. Engine 10 may be controlled at least partially by a control system including controller 48 and by input from a vehicle operator 132 via an input device 130. In this example, input device 130 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30. Crankcase 28 contains gas and may include an oil sump 32, otherwise referred to as an oil well, holding engine lubricant (e.g., oil) positioned below the crankshaft. An oil fill port 29 may be disposed in crankcase 28 so that oil may be supplied to oil sump 32. Oil fill port 29 may include an oil cap 33 to seal oil port 29 when the engine is in operation. A dip stick tube 37 may also be disposed in crankcase 28 and may include a dipstick 35 for measuring a level of oil in oil sump 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injectors (not shown) and intake air from intake manifold 42 which is positioned downstream of throttle 44. The engine block 26 may also include an engine coolant temperature (ECT) sensor 46 input into an engine controller 48 (described in more detail below herein).

A throttle 44 may be disposed in the engine intake to control the airflow entering intake manifold 42 and may be preceded upstream by compressor 50 followed by charge air cooler 52, for example. An air filter 54 may be positioned upstream compressor 50 and may filter fresh air entering intake passage 56.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate bypassing it. Sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 48.

In the example of FIG. 1, a positive crankcase ventilation system (PCV) 16 is coupled to the engine intake so that gases in the crankcase may be vented in a controlled manner from the crankcase. During non-boosted conditions (when intake manifold pressure (MAP) is less than barometric pressure (BP)), the crankcase ventilation system 16 draws air into crankcase 28 via a breather or crankcase ventilation (vent) tube 74. A first end 101 of crankcase vent tube 74 may be mechanically coupled, or connected, to fresh air intake 12 upstream of compressor 50. In some examples, the first end 101 of crankcase ventilation tube 74 may be coupled to fresh air intake 12 downstream of air filter 54 (as shown). In other examples, the crankcase ventilation tube may be coupled to fresh air intake 12 upstream of air filter 54. In yet another example, the crankcase ventilation tube may be coupled to air filter 54. A second end 102, opposite first end 101, of crankcase ventilation tube 74 may be mechanically coupled, or connected, to crankcase 28 via an oil separator 81.

In some embodiments, crankcase vent tube 74 may include a pressure sensor 61 coupled therein. Pressure sensor 61 may be an absolute pressure sensor or a gauge sensor. One or more additional pressure and/or flow sensors may be coupled to the crankcase ventilation system at alternate locations. For example, a barometric pressure sensor (BP sensor) 51 may be coupled to intake passage 56, upstream of air filter 54, for providing an estimate of barometric pressure (BP). In one example, where pressure sensor 61 is configured as a gauge sensor, BP sensor 51 may be used in conjunction with pressure sensor 61. In some embodiments, a compressor inlet pressure (CIP) sensor 58 may be coupled in intake passage 56 downstream of air filter 54 and upstream of compressor 50 to provide an estimate of the compressor inlet pressure (CIP).

During non-boosted conditions, the crankcase ventilation system vents air out of the crankcase and into intake manifold 42 via conduit 76 which, in some examples, may include a one-way PCV valve 78 to provide continual evacuation of gases from inside the crankcase 28 before connecting to the intake manifold 42. In one embodiment, the PCV valve may vary its flow restriction in response to the pressure drop across it (or flow rate through it). However, in other examples conduit 76 may not include a one-way PCV valve. In still other examples, the PCV valve may be an electronically controlled valve that is controlled by controller 48. It will be appreciated that, as used herein, PCV flow refers to the flow of gases through conduit 76 from the crankcase to the intake manifold. Similarly, as used herein, PCV backflow refers to the flow of gases through conduit 76 from the intake manifold to the crankcase. PCV backflow may occur when intake manifold pressure is higher than crankcase pressure (e.g., during boosted engine operation). In some examples, PCV system 16 may be equipped with a check valve for preventing PCV backflow. It will be appreciated that while the depicted example shows PCV valve 78 as a passive valve, this is not meant to be limiting, and in alternate embodiments, PCV valve 78 may be an electronically controlled valve (e.g., a powertrain control module (PCM) controlled valve) wherein a controller may command a signal to change a position of the valve from an open position (or a position of high flow) to a closed position (or a position of low flow), or vice versa, or any position there-between.

During boosted conditions (when MAP is greater than BP), gases flow from the crankcase, through oil separator 81 and into fresh air intake 12 and eventually into the combustion chamber 34. This may be done in a stale air manner where no intake manifold air is let into the crankcase or in a positive crankcase ventilation manner where some manifold air is metered into the crankcase.

While the engine is running under light load and moderate throttle opening, the intake manifold air pressure may be less than crankcase air pressure. The lower pressure of the intake manifold draws fresh air towards it, pulling air from the crankcase vent tube 74 through the crankcase (where it dilutes and mixes with combustion gases), out of the crankcase via the PCV conduit through the PCV valve, and into the intake manifold. However, during other conditions, such as heavy load or under boosted conditions, the intake manifold air pressure may be greater than crankcase air pressure. As such, intake air may travel through the PCV conduit and into the crankcase.

The gases in crankcase 28 may consist of un-burned fuel, un-combusted air, and fully or partially combusted gases. Further, lubricant mist may also be present. As such, various oil separators may be incorporated in positive crankcase ventilation system 16 to reduce exiting of the oil mist from the crankcase through the PCV system. For example, conduit 76 may include a uni-directional oil separator 80 which filters oil from vapors exiting crankcase 28 before they re-enter the intake manifold 42. Another oil separator 81 may be disposed in crankcase vent tube 74 to remove oil from the stream of gases exiting the crankcases during boosted operation. Additionally, in some embodiments, conduit 76 may also include a vacuum sensor 84 coupled to the PCV system.

Controller 48 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 48 may receive various signals from various sensors coupled to engine 10, engine coolant temperature (ECT) from temperature sensor 46; a measurement of intake manifold pressure (MAP) from pressure sensor 120; a measurement of barometric pressure from BP sensor 51; exhaust gas air/fuel ratio from exhaust gas sensor 64; and other PCV diagnostic sensors described below. Storage medium read-only memory 112 can be programmed with computer readable data representing instructions executable by processor 108 for performing the methods described below, as well as other variants that are anticipated but not specifically listed.

Under certain conditions, crankcase ventilation systems may be monitored by a variety of sensors to identify breaches in the crankcase ventilation system. For example, a crankcase ventilation tube may become disconnected, an oil cap may be off or loose, a dipstick may be out, and/or other seals in the crankcase ventilation system may be compromised. Degradation of various components included in the crankcase may then occur. Degradation or disconnection of the crankcase ventilation tube may be indicated by various methods.

In some embodiments, a plurality of absolute sensors, e.g., a barometric pressure sensor (BP) 51, a compressor inlet pressure sensor (CIP) 58, and/or a pressure sensor 61 in the crankcase vent tube 74, may be used in combination to monitor crankcase ventilation system integrity. For example, in some approaches, a barometric pressure sensor 51, a compressor inlet sensor 58, and a pressure sensor 61 in the PCV breather tube 74 may all be used in to monitor crankcase ventilation system integrity.

In a preferred embodiment, these sensors may be unnecessary and instead a humidity sensor 20 may be used to monitor crankcase ventilation system integrity. The humidity sensor 20 may be positioned or located inside the crankcase ventilation tube 74, nearer the first end 101. In an alternative embodiment, the humidity sensor may be positioned a small amount downstream of first end 101 in fresh air intake 12, near the first end 101 of the crankcase vent tube. The placement of the humidity sensor in the crankcase ventilation tube 74 may offer the advantage of identifying breaches in the crankcase ventilation system, such as disconnection of the crankcase ventilation tube. For example, the sensed humidity of humidity sensor 20 may be in certain ranges during boosted and non-boosted conditions and disconnection of the crankcase ventilation tube may cause the sensor to read a different value, outside these expected ranges. Thus, an indication of crankcase ventilation tube disconnection may be generated.

For example, during non-boosted engine operation, when MAP is less than BP, the humidity sensor 20 may read ambient humidity. While operating in a non-boosted condition, ambient air may be drawn into the crankcase through crankcase vent tube 74. In this condition, the humidity sensor is exposed to ambient air. Thus, the humidity sensor reads ambient humidity. This reading may then be used by the controller to adjust engine operating parameters based on the sensed ambient humidity. Adjusting engine operating parameters may include adjusting one or more of a grille shutter system, an electric fan, a variable volume charge air cooler, charge air cooler purging operations, a throttle opening to control air flow rate, spark timing, and downshifting operations. In another example, ambient humidity may be used to estimate and/or track condensate formation internal to the charge air cooler. Condensate formation information may then be used to adjust the above operating parameters. For example, increased ambient humidity may increase condensate formation. In response, the controller may trigger charge air cooler purging operations to reduce condensate and the likelihood of engine misfire.

During boosted engine operation, when MAP is greater than BP, the humidity sensor may feel the crankcase gases and read a value greater than ambient humidity. For example, when MAP is greater than BP, gases may exit the crankcase and enter the crankcase ventilation tube to vent out into fresh air intake 12. These gases may have a higher humidity than ambient humidity, causing the humidity sensor to read a higher humidity value. In a stale air crankcase ventilation system, crankcase gases may not be purged or vented with ambient air. If the crankcase ventilation system is configured to be a stale air system in boost mode, the crankcase effluent may become increasingly humid since the crankcase gases are not being diluted with ambient air. Even in crankcase systems that are continuously vented with fresh or ambient air, the relative humidity may be high relative to ambient air. Thus, as boosting continues (e.g., as the MAP>BP condition continues), there may be a significant humidity increase. After MAP is greater than BP for a duration, the humidity may saturate at a relative humidity of substantially 100%. Thus, when MAP is greater than BP, the crankcase ventilation tube may be connected if humidity is greater than a threshold humidity. In one example, the threshold humidity may be ambient humidity plus a threshold amount. The threshold amount may be based on percentage increase in humidity. For example, a humidity increase of 10% relative humidity may indicate that the crankcase ventilation tube is connected. In another example, this percentage may be higher than 10%. In another example, the threshold humidity may be a value of 100%. When the humidity is substantially 100%, the crankcase ventilation tube may be connected. In yet another example, the threshold humidity may be any value greater than ambient humidity. In another embodiment, if the humidity failed to reach a threshold value, such as 90% relative humidity, after a duration at the boosted condition, then crankcase ventilation tube degradation may be indicated.

As such, when MAP is greater than BP, the crankcase ventilation tube may be disconnected if humidity is less than the threshold humidity. For example, if the sensed humidity is less than ambient humidity (e.g., the most recent ambient humidity measurement), the crankcase ventilation tube may be disconnected. In another example, when the threshold humidity is greater than ambient humidity (e.g., threshold amount is a positive value) and the sensed humidity is less than this value, the crankcase ventilation tube may be disconnected. In some cases, when changing from a non-boosted to a boosted operating condition, there may be a delay in indicating a crankcase ventilation system breach or tube disconnection. This may allow the sensed humidity to increase a threshold amount from ambient humidity. As such, a false indication of crankcase ventilation tube disconnection may be reduced. If, after a duration or delay, the humidity is not above the threshold humidity, the controller may indicate a disconnection of the crankcase ventilation tube.

Crankcase ventilation system degradation may result from crankcase ventilation tube degradation or disconnection, a loose or disconnected oil cap, a dipstick out of position, and/or other seals in the crankcase ventilation system being broken resulting in degradation of various components included in the crankcase. The crankcase vent tube may become disconnected at first end 101 or second end 102. If the crankcase vent tube 74 is disconnected at the crankcase, or second end 102, the humidity sensor may only see ambient humidity and not sense the humid gases from the crankcase. Thus, the humidity sensor would read a lower value than expected under boosted conditions. Alternatively, if the crankcase vent tube disconnect occurs at first end 101, the humidity sensor may not detect a disconnect at first end 101. However, if the crankcase vent tube disconnect is located on the crankcase side of humidity sensor 20, then a disconnect there is detectable in the same manner as a disconnect at second end 102. A disconnect between PCV vale 78 and oil separator 80, an oil cap off, or a dipstick out of position may create a very large venting (dilution) flow rate at high engine air flow rates. Thus, the sensed humidity may be lower than expected due to the high fraction of ambient air diluting the humid crankcase gasses.

In addition to diagnosing crankcase ventilation tube degradation, the humidity sensor may provide diagnosis of the correct functioning of the humidity sensor itself. As discussed above, when MAP is less than BP, the humidity sensor may read ambient humidity. When MAP is greater than BP, the humidity sensor may read a value greater than ambient humidity. Thus, if the sensed humidity does not change under these two conditions, the humidity sensor may be malfunctioning. For example, if engine operation changes from boosted to not boosted, or from not boosted to boosted, and the sensed humidity does not change, the sensor may be failing.

Finally, the location of the humidity sensor in the crankcase ventilation tube may also provide a measure of blowby. During engine operation, a small amount of fuel and exhaust gas may escape between the piston 38 and chamber walls 36 and enter the crankcase 28. This may be referred to as blowby. As the engine degrades over time, blowby may increase. In this way, a higher blowby rate may indicate a larger amount of engine degradation. The humidity sensor may provide an estimate of the blowby rate. For example, when the engine transitions from being non-boosted to boosted, the rate of humidity increase may approximate the blowby rate. When the blowby rate increases above a threshold rate, engine degradation may be indicated. In one example, if excessive blowby is present, the humidity sensor may read 100% relative humidity at all times. A clogged PCV valve (e.g., no fresh air diluting crankcase gasses) may also result in a humidity sensor reading of 100% relative humidity under both boosted and non-boosted conditions. Thus, in some examples, excessive blowby and a clogged PCV valve may produce the same results with this detection method. However, both conditions may result in crankcase ventilation system degradation and indicate so with this method.

In this way, an indication of crankcase ventilation tube disconnection may be based on humidity, determined from a humidity sensor located in the crankcase ventilation tube. When MAP is less than BP, the humidity sensor may read ambient humidity. A controller may then adjust engine operating parameters based the sensed ambient humidity. When MAP is greater than BP, the humidity may be greater than a threshold humidity, indicating the crankcase ventilation tube is connected. However, when sensed humidity is less than the threshold humidity, the crankcase ventilation tube may be disconnected. The humidity sensor may further provide a diagnosis of humidity sensor function and estimation of a blowby rate.

In an alternate embodiment, MAP and compressor inlet pressure (CIP) and/or MAP and crankcase pressure may be used instead of MAP and BP to determine when the engine is boosted or not boosted. In this way, the relationship between MAP and CIP or crankcase pressure may be used to assess the reading from the humidity sensor and determine crankcase ventilation tube degradation. For example, when MAP is less than CIP, the engine may not be boosted and the humidity sensor may read ambient humidity. In another example, when MAP is greater than CIP or crankcase pressure, the humidity may be greater than a threshold humidity, indicating the crankcase ventilation tube is connected, or not degraded. Thus, in the present application, CIP and/or crankcase pressure may be used in place of BP when determining boosted/non-boosted engine operating conditions and analyzing humidity sensor readings.

Turning to FIG. 2, a method for diagnosing a crankcase ventilation tube connection is shown. The routine begins at 202 by estimating and/or measuring engine operating conditions. Engine operating conditions may include engine speed and load, MAP, humidity (e.g., sensed humidity measured from humidity sensor 20), air mass flow, barometric pressure (BP), etc. At 204, the controller may use this information to determine whether the engine is boosted. For example, if MAP is greater than BP, the engine may be boosted, otherwise, it may be determined that the engine is not boosted. A method for determining engine boosting is presented in further detail at FIG. 3. If the engine is not boosted at 204, the humidity sensor may read ambient humidity. Thus, at 206, the ambient humidity value is set to the sensed humidity value from the humidity sensor. At 208, no crankcase ventilation tube connection diagnosis is made. The method continues on to 210 to adjust engine operating parameters based on the sensed ambient humidity. Adjusting engine operating parameters may include adjusting one or more of a grille shutter system, an electric fan, a variable volume charge air cooler, charge air cooler purging operations, a throttle opening to control air flow rate, spark timing, and downshifting operations. For example, in response to increased ambient humidity, the controller may close the grille shutters to reduce cooling to and condensate formation in the CAC. In this way, engine operating parameters may be adjusted responsive to ambient humidity. When the engine is not boosted and the humidity sensor reads ambient humidity, engine operating parameters, such as the grille shutter system, may be adjusted responsive to the sensed humidity. However, when the engine is boosted, the sensed humidity may not read ambient humidity. Thus, in this case, engine operating parameters may be adjusted based on the most recent humidity sensor reading (e.g., during non-boosted conditions). For example, the grille shutters may be opened or closed based on the most recent ambient humidity estimation, based on the sensed humidity when the engine was not boosted. As such, engine operating parameters may be continually adjusted during both non-boosted and boosted engine operating conditions.

Returning to 204, if the engine is boosted, the routine continues on to 212 to determine if the sensed humidity is greater than a threshold humidity. The threshold humidity may be ambient humidity plus a threshold amount. In one example, the threshold amount may be small such that the threshold humidity is a value just over ambient humidity. In another example, the threshold amount may be larger such that the threshold humidity is near 100%. The threshold amount may be based on a previous ambient humidity value and engine operating conditions. For example, a relative humidity increase of the threshold amount during boosting may indicate no crankcase ventilation tube degradation, or that the crankcase ventilation tube is connected. In one example, the threshold amount may be a percentage increase, such as 10%. In another example, the percentage increase may be higher. In some embodiments, a humidity (e.g., relative humidity) of substantially 100% may indicate the crankcase ventilation tube is connected.

If the sensed humidity is greater than the threshold humidity at 212, the routine determines at 214 that the crankcase ventilation tube is connected. However, if the sensed humidity is not greater than the threshold humidity at 212, the routine determines at 216 that the crankcase ventilation tube is disconnected. In some examples, the routine at 216 may include indicating to the driver or vehicle operator that the crankcase ventilation tube is disconnected. In some embodiments, method 200 may include an additional step after 212 which may include waiting a duration and then re-checking if the sensed humidity is still below the threshold humidity at 212. This may allow time for the humidity sensor to equilibrate and rise to a steady-state value. For example, when changing from a non-boosted to boosted condition, it may take a duration for the humidity to increase above the threshold value. In this case, the crankcase ventilation tube may be connected if the sensed humidity is greater than the threshold humidity after a duration. This duration or delay may be small if the threshold humidity is only a small amount above ambient humidity at 212.

A method for determining engine boosting and a blowby rate is presented at FIG. 3. Method 300 begins at 302 by determining the MAP and sensed humidity values. At 304, the routine determines if MAP is less than BP. If MAP is not less than BP, the routine determines that MAP is greater than, or substantially equal to, BP at 306. As such, the routine determines the engine is boosted at 310. This condition is then used, as discussed above, in the method at FIG. 2.

Returning to 304, if MAP is less than BP, the routine determines at 312 that the engine is not boosted. The routine continues on to 314 to confirm if MAP is increasing. If MAP is not increasing, the routine determines the MAP is at steady-state at 316 and then ends. However, if MAP is increasing at 314, the routine continues on to check if MAP is greater than BP at 318. In some examples, the routine at 318 may include waiting a duration before re-checking the MAP value in relation to BP. If MAP is not greater than BP at 318, the routine continues to monitor the increase in MAP at 320 and returns to 314. If MAP is greater than BP at 318, the routine then monitors the rate of increase in humidity of the humidity sensor (e.g., sensed humidity) at 322. At 324, the routine determines if the sensed humidity is at steady-state (e.g., no longer increasing). If the humidity is not at steady-state (e.g., still increasing), the routine continues to measure the rate of increase in sensed humidity at 326 and then returns to 324.

Once the routine determines at 324 that the sensed humidity has reached steady-state, the routine then determines a blowby rate at 328. The blowby rate may be based on the rate of increase in sensed humidity. For example, a higher rate of humidity increase may indicate a higher blowby rate. As such, the rate of increase in humidity may approximate the blowby rate. At 330, the routine may determine if the estimated blowby rate is greater than a threshold rate. If the blowby rate is greater than the threshold rate, engine degradation may be indicated at 334. In some embodiments, an indication may be generated to alert the vehicle operator of the engine degradation. If the blowby rate is not greater than the threshold rate, engine degradation may not be indicated at 332. The threshold rate of blowby may be based on an acceptable blowby rate for the vehicle. For example, the threshold rate may be defined such that an amount of blowby below this threshold may be due to normal vehicle operation and not increased degradation of the engine components.

Now turning to FIG. 4, graph 400 shows example humidity sensor readings based on engine operating conditions. Specifically, graph 400 shows changes in MAP in relation to BP at plot 402 and changes in sensed humidity (from humidity sensor 20) at plot 404. In response to MAP and sensed humidity, an indication of crankcase ventilation (CV) tube connection (C) or disconnection (D) from a crankcase ventilation system may be indicated at plot 406. When MAP is greater than BP the engine is boosted and when MAP is less than BP the engine is not boosted. Ambient humidity 408 is shown at plot 404 and changes based on the sensed humidity when MAP is less than BP. The sensed humidity (e.g., humidity output from humidity sensor 20) may increase to a value of 100% when the engine is boosted.

Prior to time 1, MAP may be below BP (e.g., engine not boosted) (plot 402). As a result, the sensed humidity is ambient humidity 408 (plot 404). Before time t1, no diagnosis is made for the crankcase ventilation tube connection. At time t1, MAP increases above BP, changing engine operation from non-boosted to boosted operation (plot 402). As a result, sensed humidity increases from time t1 to time t2 (plot 404). Sensed humidity may increase above a threshold humidity 410 after a duration d1. In response, the controller may generate an indication that the crankcase ventilation tube is connected (plot 406). As described in method 200, there may be a delay in indicating the crankcase ventilation tube is disconnected when the engine switches from being un-boosted to boosted. This delay allows for the sensed humidity to increase above the threshold humidity and reduced the likelihood of a false indication of vent tube disconnection. In the example presented at graph 400, the delay may be for duration d1. The threshold humidity 410 may be a threshold amount T1 above the ambient humidity level. In another example threshold amount T1 may be smaller or larger. If the threshold amount T1 were smaller, the duration d1 may be shorter, allowing the delay in diagnosis to be shorter.

From time t1 to time t2, the controller may monitor the rate of increase in humidity R1. This rate of increase in humidity R1 may then be used to approximate a blowby rate. In the example shown at graph 400, the rate of increase in humidity R1 may be small enough such that the blowby rate is lower than a threshold rate. Thus, engine degradation may not be indicated.

At time t2, the sensed humidity saturates at 100% humidity (plot 404), indicating the crankcase ventilation tube remains connected. At time t3, MAP decreases below BP (plot 402), causing the sensed humidity to decrease and read ambient humidity 408 (plot 404). After time t3, no crankcase ventilation tube diagnosis may be made. Between time t3 and time t4, the sensed humidity may increase slightly (plot 404), indicating an increase in ambient humidity 408. At time t4, the engine switches to boosted operation and MAP increases above BP (plot 402). The sensed humidity increases at a high rate of increase in humidity R2. As a result, sensed humidity reaches the threshold humidity 410 quickly, requiring only a short delay in crankcase ventilation tube diagnosis. Once sensed humidity increases above threshold humidity 410, the controller may indicate the crankcase ventilation tube is connected. Since the rate of increase in humidity R2 may be higher, a blowby rate may be estimated to a value above the threshold rate. Thus, engine degradation may be indicated sometime between time t4 and time t5.

At time t5, the sensed humidity may saturate at 100% and stay there until time t6 (plot 404). At time t6, the sensed humidity may decrease abruptly to a level below the threshold humidity 410. At this time, MAP remains above BP. This may indicate disconnection of the crankcase ventilation tube (plot 406). In response, the controller may generate an indication of crankcase ventilation tube disconnection or a breach in the crankcase ventilation system.

In this way, a humidity sensor placed in the crankcase ventilation tube may provide a reading of ambient humidity. Engine operating parameters may be adjusted based on this humidity. Further, degradation of the crankcase ventilation tube may be based on the sensed humidity and engine boosting. For example, as shown at time t6, the crankcase ventilation tube may be disconnected when the engine is boosted and the sensed humidity is ambient humidity. In another example, as shown between time t1 and time t3 and between time t4 and time t6, the crankcase ventilation tube may be connected when the engine is boosted and the sensed humidity is a threshold amount above ambient humidity. The sensed humidity may be ambient humidity when the engine is not boosted, as shown prior to time t1 and between time t3 and time t4. In yet another example, during a transient condition when the engine goes from being unboosted to boosted (as shown at time t1 and time t4), the rate of increase in humidity approximates a blowby rate. As shown at time t4, a higher rate of increase in humidity and, accordingly, a higher blowby rate, indicates a larger amount of engine degradation.

In this way, by placing a humidity sensor in a crankcase ventilation tube, a diagnosis of the crankcase ventilation tube connection may be made. In one example, when the engine is boosted and the sensed humidity is a threshold amount above ambient humidity, the crankcase ventilation tube may be connected. In another example, when the engine is boosted and the sensed humidity is less than a threshold humidity, the crankcase ventilation tube may be disconnected. When the engine is not boosted, the sensed humidity may read ambient humidity. In response to this ambient humidity, a controller may adjust engine operating parameters. The placement of the humidity sensor in the crankcase ventilation tube may further allow estimation of a blowby rate based on the rate of increase in humidity when changing from non-boosted to boosted engine operation. A higher blowby rate may indicate engine degradation. Finally, proper functioning of the humidity sensor may be determined by monitoring changes in sensed humidity under different engine operating conditions. In this way, placement of a humidity sensor in the crankcase ventilation tube may allow for diagnosis of a crankcase ventilation tube, while also diagnosing humidity sensor functionality and engine degradation.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. An engine method, comprising:
    estimating ambient and crankcase ventilation tube humidity with a humidity sensor positioned in a crankcase ventilation tube;
    measuring intake manifold pressure with a pressure sensor;
    if the measured intake manifold pressure is less than barometric pressure, adjusting engine operation based on estimated ambient humidity; and
    if the measured intake manifold pressure is greater than or equal to barometric pressure, indicating whether the crankcase ventilation tube is degraded based on the estimated ambient humidity.

2. The method of claim 1, further comprising indicating no degradation responsive to estimated humidity of the crankcase ventilation tube being greater than a threshold humidity while intake manifold pressure is greater than barometric pressure and indicating degradation of the crankcase ventilation tube if the humidity of the crankcase ventilation tube is less than the threshold humidity, the degradation including disconnection of the crankcase ventilation tube.

3. The method of claim 2, wherein the threshold humidity is estimated ambient humidity plus a threshold amount.

4. The method of claim 2, wherein when the intake manifold pressure is greater than the barometric pressure the engine is boosted.

5. The method of claim 2, wherein the humidity saturates at a relative humidity of substantially 100% after the intake manifold pressure is greater than barometric pressure for a duration.

6. The method of claim 5, wherein no degradation is indicated when the humidity is substantially 100%.

7. The method of claim 1, further comprising approximating a blowby rate based on a rate of humidity increase responsive to the intake manifold pressure increasing from below barometric pressure to above barometric pressure.

8. The method of claim 7, wherein engine degradation is indicated responsive to the blowby rate above a threshold rate.

9. The method of claim 1, further comprising diagnosing functionality of the humidity sensor.

10. An engine method, comprising:
    adjusting engine operating parameters based on humidity, the humidity sensed in a crankcase ventilation tube; and
    indicating degradation of the crankcase ventilation tube based on the sensed humidity and an engine boosting level, and alerting a vehicle operator of the degradation.

11. The method of claim 10, wherein the engine operating parameters include one or more of a grille shutter system, an electric fan, a variable volume charge air cooler, charge air cooler purging operations, a throttle opening to control air flow rate, spark timing, and downshifting operations.

12. The method of claim 10, wherein the indicating degradation includes indicating the crankcase ventilation tube is disconnected responsive to the engine being boosted and the sensed humidity being less than a threshold humidity.

13. The method of claim 10, wherein the indicating degradation includes indicating the crankcase ventilation tube is connected responsive to the engine being boosted and the sensed humidity being greater than a threshold humidity, the threshold humidity being a threshold amount above ambient humidity.

14. The method of claim 10, further comprising indicating ambient humidity based on the sensed humidity responsive to the engine not being boosted.

15. The method of claim 10, further comprising, during a transient condition, when the engine goes from being unboosted to boosted, approximating a blowby rate based on a rate of increase in humidity.

16. The method of claim 15, wherein a higher blowby rate indicates a larger amount of engine degradation.

17. A system for an engine comprising:
    a positive crankcase ventilation system, the positive crankcase ventilation system including a crankcase ventilation tube, the crankcase ventilation tube connected at a first end to a fresh air intake and at a second end to a crankcase;

a humidity sensor, the humidity sensor located inside the crankcase ventilation tube;

a manifold absolute pressure sensor; and a controller with computer readable instructions for adjusting engine operating parameters based on humidity sensed by the humidity sensor and indicating degradation of the crankcase ventilation tube based on humidity sensed by the humidity sensor and engine boosting.

* * * * *